Dec. 16, 1930.　　　A. L. DUNCAN　　　1,785,005
FRUIT PITTING AND CORING APPARATUS
Filed Nov. 6, 1926　　3 Sheets-Sheet 1
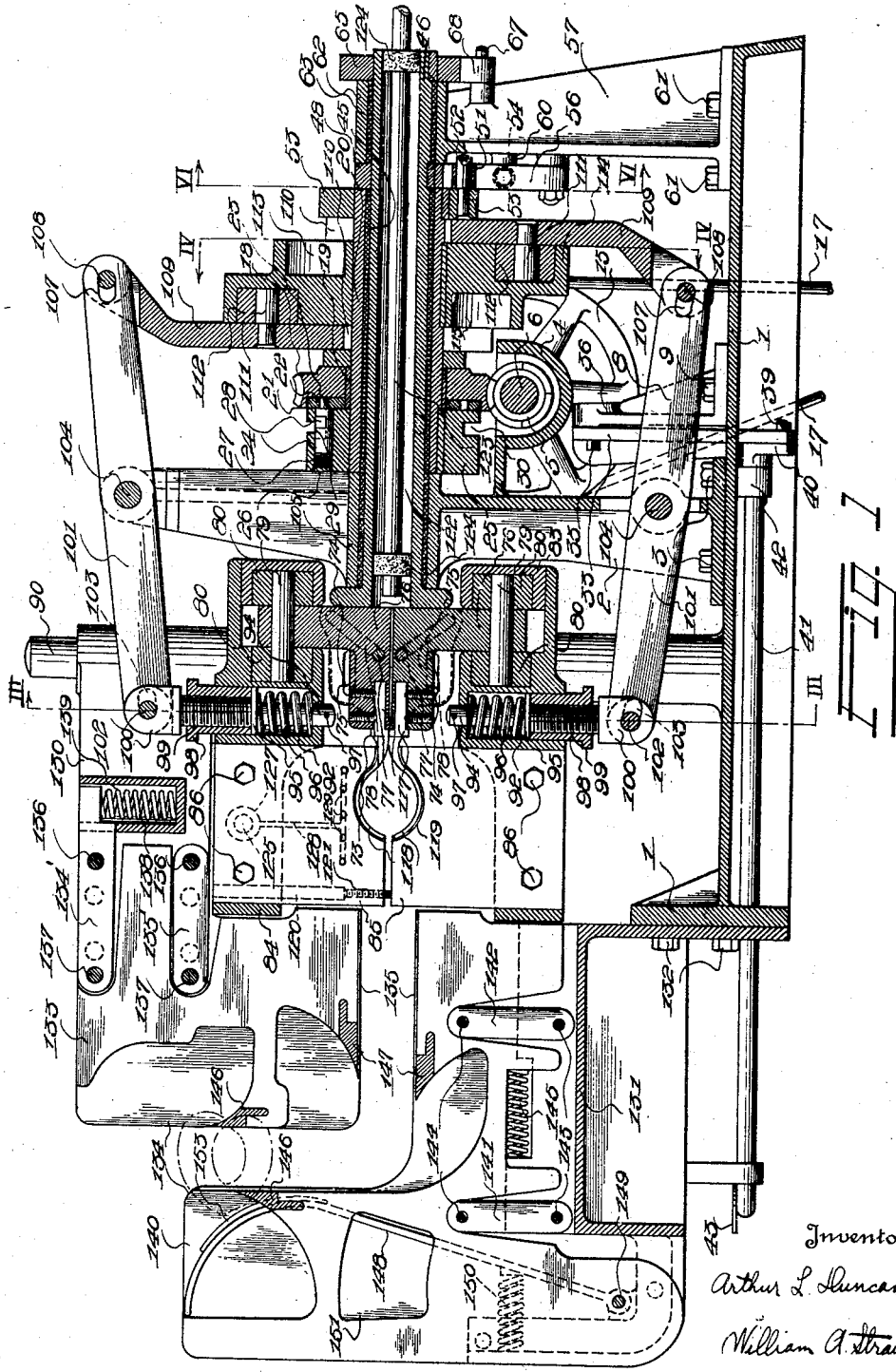
Inventor
Arthur L. Duncan
William A. Strauch
Attorney

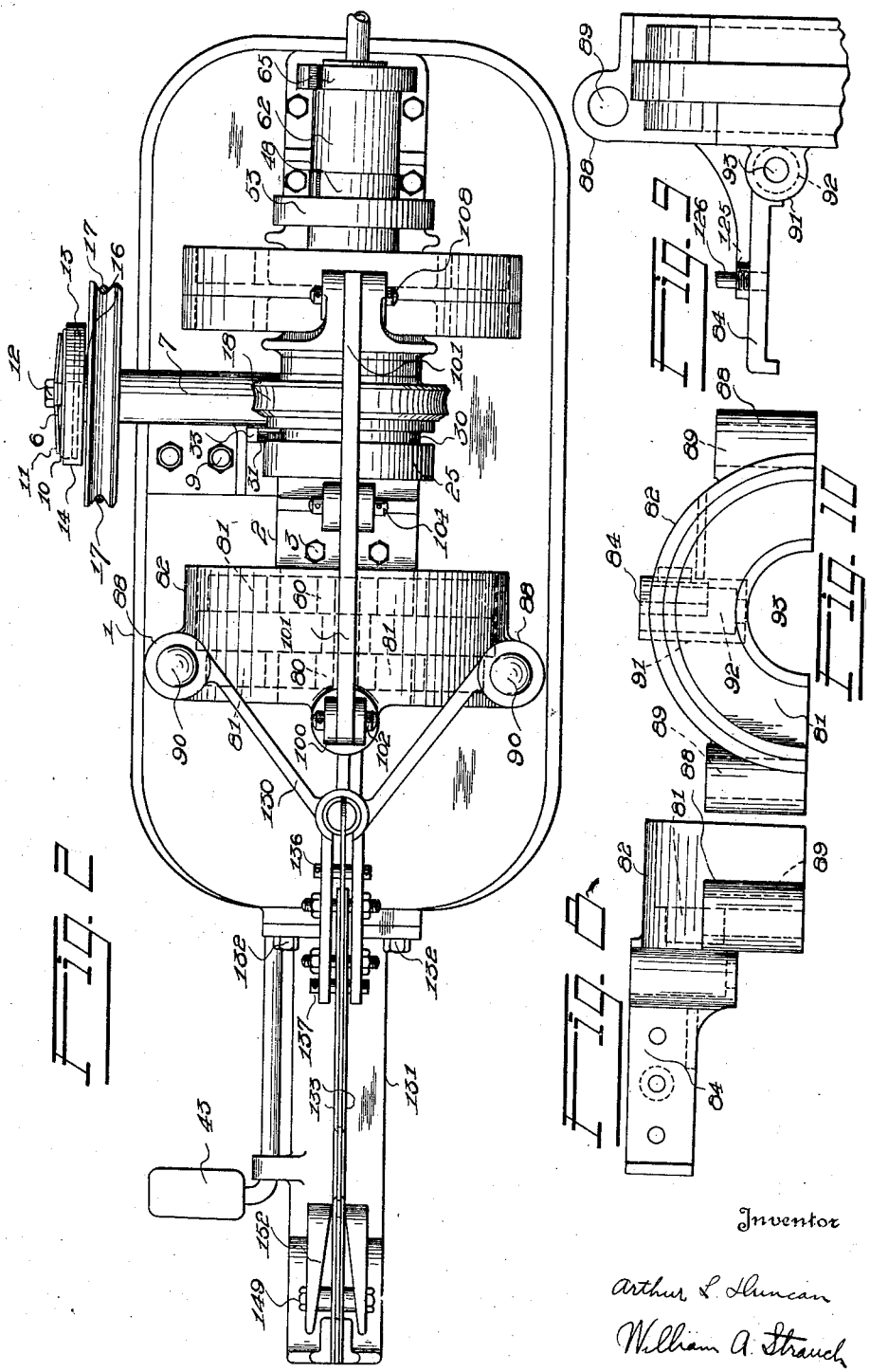

Dec. 16, 1930.  A. L. DUNCAN  1,785,005
FRUIT PITTING AND CORING APPARATUS
Filed Nov. 6, 1926   3 Sheets-Sheet 3
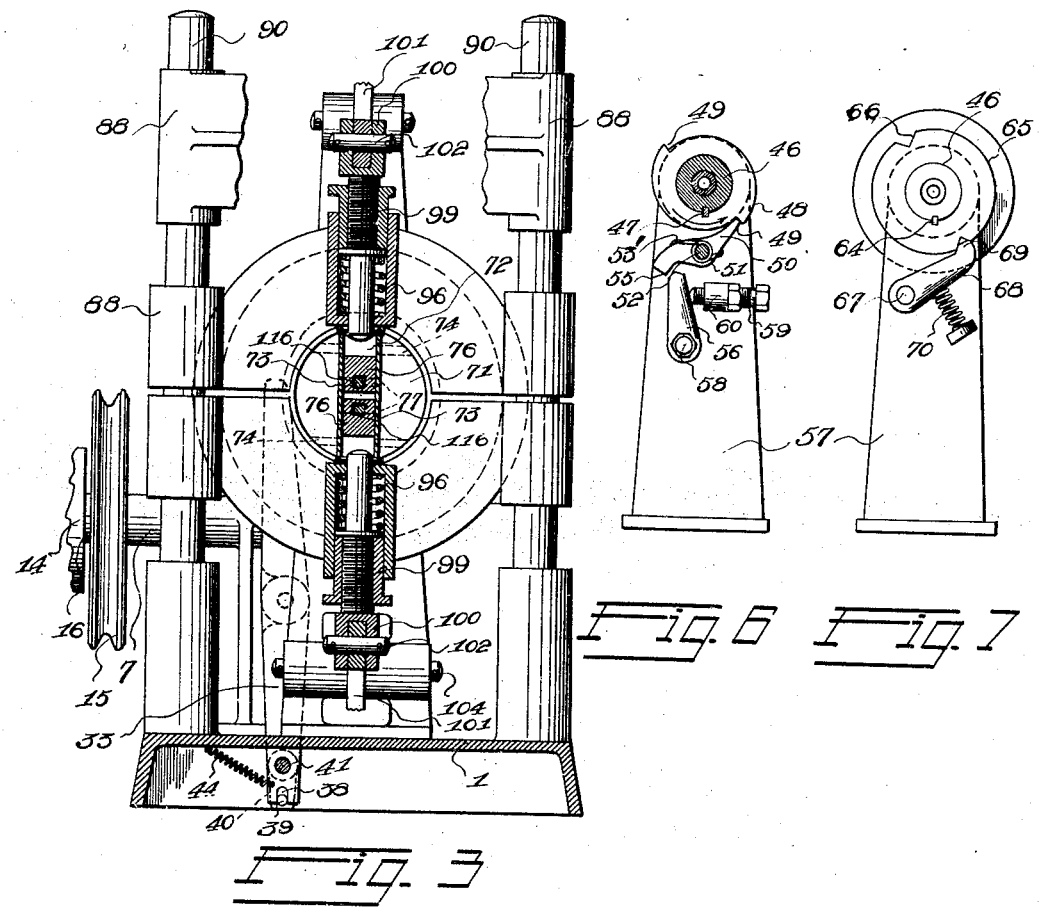
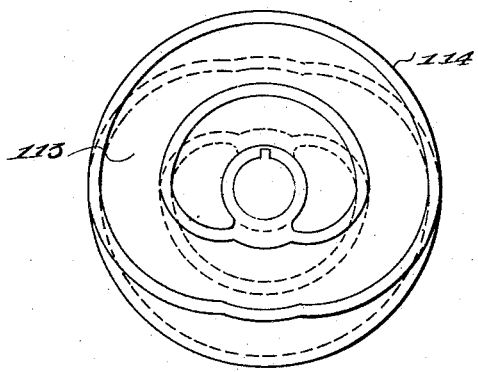
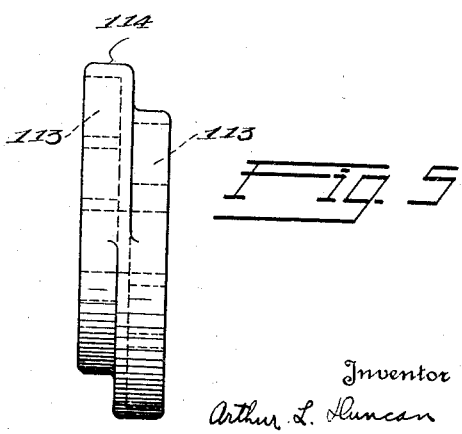
Inventor
Arthur L. Duncan
William A. Strauch
By
Attorney Patented Dec. 16, 1930

1,785,005

UNITED STATES PATENT OFFICE

ARTHUR L. DUNCAN, OF PIEDMONT, CALIFORNIA, ASSIGNOR, BY MESNE ASSIGNMENTS, TO PACIFIC MACHINERY COMPANY, OF SAN FRANCISCO, CALIFORNIA, A CORPORATION OF CALIFORNIA

FRUIT PITTING AND CORING APPARATUS

Application filed November 6, 1926. Serial No. 146,754.

The present invention relates to improvements in fruit pitting and coring methods and apparatus therefor. More particularly the invention relates to pitting and coring methods for the handling of single stone fruit, and especially adapted for pitting clingstone peaches.

In the State of California alone 15 to 20 varieties of clingstone peaches are raised and each variety has a differently shaped pit. The various varieties of peaches are delivered at different times of the year, and differ widely in size, quality, and texture. Tuscan cling peaches generally come into the canneries during the month of July, and in the latter part of July the variety of peaches known in the trade as the "new midsummers" begin to arrive. The new midsummers generally ripen in midsummer and come into the canneries in the middle of the fruit packing season. There varieties all have flesh of fine texture, are mellow and rich in golden color, and have small pits. The new midsummers are in large demand by the public because of their superior and luscious flavor and appetizing appearance, and are accordingly very desirable for canning purposes. As the Tuscan and new midsummer varieties of peaches overlap, they are carefully separated and it is the practice in a day's run to complete the cutting and pitting of the Tuscans before beginning the pitting of the new midsummers or vice-versa. The packing of the new midsummers extends approximately from the last week in July to about the end of the third week in August, and during this period certain varieties of peaches that ripen in midsummer known as the old midsummer varieties, now almost extinct are received in small quantities and must be taken in by the canners to secure desirable blocks of the new midsummers. The old midsummers are ungainly in appearance, the flesh is coarse in texture, and in handling through the lye machines and processes of peeling, the pulp often frays and they become unsightly. The old midsummers are accordingly used mostly for making sliced grades of canned clingstone peaches, and they are seldom of such quality that their use in the production of fancy or choice grades of canned goods is advisable. The variation in the size of pits in the old midsummers is extreme and lopsided irregular fins form at the suture of the pit so that the standard pitting spoons used by hand operators will not reach the length of the pit from the stem to the spike end, and in order to free the pit from the half peaches, the hand pitting operators must mutilate large portions of the flesh at the stem end to free the pits. The pits of the various varieties of peaches range in the greatest diameter of the suture perpendicular to the stem and spike end of the pit from three-quarters of an inch to one and three-quarter inches, more or less, according to the variety of peach, while approximately every variety in turn has a range of about three-eighths of an inch variation in the greatest diameter of the suture perpendicular to the stem and spike end of the pit according to the size of the peach in a particular shipment and the maturing conditions and localities under which the peaches are raised. When peaches ripen they are not all of the same size in any one variety, and a box of peaches weighing from 40 to 45 pounds of the Phillips variety, for example, will ordinarily have peaches from approximately two and three-eighths inches in diameter to four and one-quarter inches in diameter, all in the same box, and all from the same tree. The pits from these peaches will range in the greatest diameter of the suture perpendicular to the stem and spike end of the pit from approximately one and one-sixteenth inches to one and seven-sixteenth inches, while the stem to the spike end of the pits will vary in length from one and three-eighths inches to one and three-quarter inches while occasionally from certain localities the variation is even greater. Efforts to pit peaches in a commercial way and in large quantities with a single knife, not adjustable for the varying sizes of pits in standard varieties of peaches, even though a different knife is used for each variety, result in a substantial waste as provision must be made to remove the largest pit, with the result that a substantial portion of useful flesh is cut from the peaches having the smaller pits.

In accordance with my improved methods of pitting and coring fruit, a central core comprising the substantially intact pit is severed from the remaining pulp by a cut or cuts starting from the plane of the suture of the pit. In the preferred embodiments of my present invention, a single pair of oppositely disposed pitting knives adapted to adjustably encompass the substantially whole or intact pit of the fruit to be cored or pitted substantially in the plane of the pit suture from stem to spike end of the fruit is utilized for all standard sizes of peaches of the different varieties received during a season, while special knives are utilized merely for pitting abnormal peaches. In this way the number of different knives that must be provided and the labor incident to changing knives and making adjustments and the expense attached thereby is reduced to a minimum. The knives are adjusted until they substantially contact with and generally conform in curvature to the suture of the pit before starting the severing motion through the fruit. After the adjustment is effected substantially to the pit size a central core comprising the pit is severed from the remainder of the fruit by causing the knives to move through the fruit, about an axis of rotation approximately through the stem and spike end of the pit, hereinafter termed the longitudinal axis of the fruit or pit. Preferably the knives are moved with relation to the longitudinal pit axis causing them to follow a path that corresponds in shape approximately to the shape of the pit sizes, but unguided by the pit sides, to eliminate waste of desirable fruit pulp. When the knives are adjusted to encompass the pit, with the knives pressed into engagement with a predetermined pressure against the suture of the pit, the fruit pit is centered between the encompassing knives. As the path of the knives through the fruit is unguided by and independent of the shape of the pit only unusual obstructions are encountered by the knives due to pit irregularities.

My improved method comprises in its preferred form the initial formation in the peach of a substantially peripheral groove or channel preferably about one-quarter inch in width in the plane of the suture of the pit in which the severing means are entered and adjusted as above set forth. Because of the formation of this groove, I have found it possible to cut the pulp halves from the fruit with the ends of the curved knives separated by a quarter inch or more from each other, and by providing a novel method of adjusting the knives about the suture of the pit to be removed, I am enabled to use a single set of knives for pitting all standard varieties of peaches, a result not heretofore attainable.

Accordingly, a primary object of my invention is to provide novel methods and apparatus for pitting peaches whereby a single mechanism may be adjusted to efficiently and economically pit all of the standard varieties of peaches received during the course of a canning season, without varying the size or shape of the pitting knife or knives; and to provide an apparatus in which the pitting knife or knives and parts may be readily interchanged for special knife or knives when pits of extraordinary or unusual size are encountered in any particular variety.

Another object of the invention is to provide novel methods and apparatus for pitting peaches, that are adjustable to the size of the pit to be removed, and by which a central core including the pit is removed from the fruit which has a surface shaped independently of the shape of the pit, but the surface follows generally the curvature of the pit sides and may be varied from a true circular to relatively flattened or oval shapes to meet the variations in shape of pits in the different varieties of fruit, whereby waste of fruit pulp is minimized and a high grade product is secured.

A further object of the invention is to provide a simplified apparatus for carrying out my improved method of pitting peaches in which novel means are provided for clearing the mechanism of the severed cores including the pits and fruit halves, and for maintaining the mechanism in clean and sanitary condition.

Still a further object of the invention is to provide a novel drive for pitting apparatus adapted to sever a central core comprising the whole pit from a peach, comprising a yieldable or slipping drive to prevent knife breakages.

Further objects of the invention are such as may be attained by a utilization of the various combinations, sub-combinations and principles hereinafter set forth and as defined by the terms of the appended claims.

As shown in the drawings—

Figure 1 is a sectional elevation showing a preferred embodiment of my invention.

Figure 2 is a plan view of the form of invention shown in Figure 1.

Figure 3 is a sectional view taken along the line III—III of Figure 1, looking in the direction of the arrows.

Figure 4 is a detailed view of an operation controlling cam as seen from the line IV—IV of Figure 1.

Figure 5 is a plan view of the cam shown in Figure 4.

Figure 6 is a detailed sectional view taken along line VI—VI of Figure 1 showing the driving ratchet.

Figure 7 is a detailed end view showing the registering disk and stop pawl.

Figures 8, 9 and 10 show the cam holders in side elevation, plan and end elevation respectively.

Referring to Figures 1 and 2 the numeral 1 indicates a base casting to which the bearing bracket 2 is secured by means of cap screws 3. Formed integrally with the bracket 2 is a casing section 4 (Figure 1) in which worm 5 is disposed. Worm 5 is rigidly secured to and driven by a drive shaft 6 which is supported in bearings 7 (Figures 2 and 3) of the supporting bracket 8 secured to the base 1 by cap screws 9. Slidably keyed to the end of the shaft 6 is a friction driving plate or disk 10 (Figure 2) which is urged inward under the pressure of flat spring 11, which abuts against the head of the tension adjusting cap screw 12 threaded into the end of the shaft 6. Drive disk 10 is forced against a fiber or other suitable friction disk 13 by spring 11 and disk 13 abuts against a friction clutch member 14. Clutch member 14 is connected to and rotatable with grooved drive pulley 15 by means of the connecting sleeve section 16. Clutch member 14, pulley 15 and the sleeve 16 are journaled for rotation on the drive shaft 6. Pulley 15 is driven by a belt 17 from a suitable prime mover.

Meshing with and driven by the worm 5 is a worm gear 18, which is provided with a bushing 19 and is journaled for rotation on the sleeve 20. Inserted in a suitable recess formed in and rigidly secured to the gear 18 is a hardened steel driving disk 21 (Figure 1) around the face of which a series of spaced clutch holes 22 are formed. Projection or pin 23 of a sliding clutch member 24 is adapted to fit into holes 22. Clutch member 24 is mounted in a suitable bore formed in clutch disk 25 which in turn is keyed to and drives the sleeve 20. Interposed between screw plug 26, closing the end of the bore in disk 25 and the inner end of the clutch pin 24 is a coil spring 27. Member 24 has a notch or groove 28 provided with an inclined cam wall 29. With the end 23 of clutch pin nested in one of the holes 22, a driving connection is established between the gear 18 and the clutch disk 25. Side wall 29 of groove 28 is positioned in a clutch pawl groove 30 formed in the periphery of the clutch disk 25. Normally resting in the groove 30 is the beveled cam end 31 (Figure 2) of the clutch pawl 33. Clutch pawl 33 is pivotally supported on a fulcrum pin 35 supported in boss 36 of the bracket 8. In the lower end of pawl 33 slot 38 is formed into which the end of actuating pin 39 slidably fits. The pin 39 is secured to the lower end of the actuating arm 40 which at its upper end is secured to the end of and actuated by rocking shaft 41. Shaft 41 is journaled in a suitable extension 42 of the base casting 1 and is provided with actuating hand plate 43 positioned to be conveniently engaged by the hand of the operator immediately after a fruit is in position to be cored as will more fully hereinafter appear. A suitable spring 44 (Figure 3) may be connected between the clutch pawl 33 and the base casting 1 to hold the beveled end 31 of the pawl 33 normally in position in the groove 30 of the clutch disk 25.

Sleeve 20 is provided with an internal bushing 45 journaled for rotation on hollow main shaft 46. Mounted on main shaft 46 and secured thereto by key 47 (Figure 6) is a ratchet disk 48 provided with the diametrically opposite ratchet teeth 49. Ratchet teeth 49 are adapted to be engaged by the end 50 of a pawl 51 which is pivotally supported on pin 52. Springs 53' coiled about pin 52 is arranged to force the pawl 51 about its pivot so that the end 50 thereof is held against the periphery of ratchet 48. Pin 52 is rigidly secured in a disk 53 which is mounted on and keyed to the rear end of sleeve 20. Pawl 51 is provided with an extension 55 which is adapted to engage the upper end of throw-out latch 56 (Figures 1 and 6). Latch 56 is secured on an extension of rear bearing bracket 57 by means of securing stud 58. An adjusting stop screw 59 threaded in an extension 60 of the bearing bracket 57 is provided for latch 56. By adjusting stop screw 59 and shifting latch 56, the point in the cycle of operations at which the extension 55 of pawl 51 will engage the end of the latch 56 may be varied.

Bearing bracket 57 is secured to base casting 1 by means of the cap screw 61, and formed at the upper part of the bracket is a journal 62 provided with a bushing 63 in which the main shaft 46 is journaled for rotation. Supported on the outer end of the main shaft 46 and secured thereto by means of key 64 (Figure 7) is registering disk 65 provided with diametrically opposite stop notches 66. Secured to and pivotally supported from bracket 57 by means of the pivot pin 67 is a registering latch 68 which is provided with a registering extension 69 adapted to fit into the registering notches 66 and thereby locate shaft 46 in normal position. Helical spring 70 interposed between an extension of bracket 57 and registering latch 68 normally forces the extension 69 of the latch into engagement with the periphery of the registering disk 65.

Main shaft 46 has formed integrally with the inner end thereof a head 71 provided with a central guide slot 72 (Figures 1 and 3) against the sides of which a pair of slidable gauge plates 73 are supported. Secured in head 71 are pins 74 which extend into guide slots 75 formed in the gauge plates 73. Slidably supported and guided for reciprocation between the gauge plates 73 are knife holders 76. Secured in the knife holders 76 are the pins 77, the ends of which extend into the inclined actuating slots 78 of the gauge plates 73. Secured in the outer ends of the knife holders 76 are the cam roller supporting pins 79 (Figure 1) on which the knife actuating cam rollers 80 are journaled. Rollers 80 are mounted in cam grooves 81 of the cam holders (Figure 10). In operation, rotation of the head 71 drives the knife holders 76 and rotates the rollers 80 through the cam grooves 81. Cam grooves 81 may be made of any suitable shape, but are preferably of such shape that the rollers 80 follow a path to conform generally to the curvature of the pit to be removed. In varieties of fruit having pits substantially circular in transverse section a cam with a circular groove 81 may be utilized, while with fruit having flattened sides, groove 81 may be shaped to cause rollers 80 to follow a path of varying radius to cut an oval shaped core from the fruit to be cored, as will more fully hereinafter appear. Outer cam grooves 81 are preferably formed in cam members 83 which are rigidly secured to the cam holders 82 for convenience in construction. Cam holders 82 have formed integrally therewith jaw holders 84 which are recessed to receive jaws 85. (Figures 1 and 8 to 10). Jaws 85 (Figure 1) are secured to holders 84 by means of suitable cap screws 86 and are of a suitable width to enter an annular groove or channel formed in the fruit to be pitted. Formed on opposite sides of the cam holders 82 are the bosses 88 in which bores 89 are formed. Bores 89 slidably fit on the vertical guide posts 90 (Figures 1 and 2) which are rigidly secured to and suitably spaced on base casting 1. Formed centrally in each of the holders 82 are bosses or extensions 91 in which bores 92 and 93 are formed. Extending through bores 93 are the inner ends of pins 94 (Figure 1) provided with washers 95 which slidably fit in bores 92. Interposed between the bottoms of bores 92 and washers 95 of pins 94 are helical compression springs 96. Cotter pins 97 extending through the end of pins 94 normally hold the parts in assembled relation. Fitting slidably into the bores 92 are the sleeve members 98 which are threaded on the ends of coupling members 99 that may be adjusted to vary the operating tension of springs 96. Coupling members 99 are provided with bifurcated ends 100 between which ends of actuating levers 101 are disposed. Actuating levers 101 are secured to the bifurcated ends 100 by means of the pins 102 which are supported in said ends and pass through slots 103 of the actuating levers 101. Levers 101 are fulcrumed by means of pins 104 to suitable extensions of the bearing bracket 2. Bracket 2 is also provided with a suitable bushed bearing section 105 in which the forward end of main shaft 46 is journalled. The opposite ends of actuating arms 101 are provided with slots 107 through which pins 108 pass. Pins 108 are secured in suitable extensions of vertical reciprocating members or levers 109. The inner ends of the levers 109 are slotted at 110 to fit slidably over sleeve 20. Rigidly secured in and protruding from levers 109 are pins 111 on which the cam rollers 112 are journaled. Cam rollers 112 are mounted in cam grooves 113 of the actuating cam 114 (Figures 1, 4 and 5). Actuating cam 114 is keyed to and driven by sleeve 20.

Formed in the knife holders 76 are suitable rectangular recesses 116 adapted to receive the rectangular shanks 117 of the curved pitting knives 118. Knives 118 are narrow, being preferably one-quarter inch or less in width to fit into a channel or recess formed in a fruit to be pitted, and are provided with outwardly beveled cutting edges. Knives 118 are preferably made of yieldable spring steel and are so positioned that they normally nest within curved recesses 119 formed in jaws 85. It will be noted that knife holders 76 and knives 118 are movable with the jaws 85. To limit the inward motion of the jaws and knives to accommodate different sizes of fruit pits or cores, a bore 120 is formed in the upper one of the jaws 85 and at the bottom of this bore is a threaded section in which adjustable stop screw 121 is threaded.

Means are provided for clearing the machine of the fruit halves and the core after the central core has been severed from the pulp, and to remove particles of pulp which tend to adhere to the mechanism. Formed centrally in main shaft 46 is a bore 122 in which a pipe or tube 123 for the passage of fluid under pressure or compressed air is supported on the packing and spacing members 124. The inner end of the pipe 123 is disposed immediately back of the knife holders so that a compressed air blast or other fluid from the pipe will force the core from between the knives 118 and will clear the machine of adhering pulp as will more fully hereinafter appear. It will be understood that pipe 123 need not be disposed in the bore in the main shaft but may be placed in various positions to dislodge the core and clear the knife holders and machine of objectionable material. To provide for the rapid removal of the pulp halves, a threaded bore 125 (Figures 1 and 9) is formed in the upper knife holder in which the end of a tube 126 is threaded. The end of bore 125 registers with a recess or bore 127 formed in the upper jaw 85 and communicating with the bore or recess 127 are the fluid or compressed air distributing ducts 128 formed internally in the jaw. A set of fluid or compressed air outlet holes 129 drilled through the upper jaw 85 and communicating with the lateral section of duct 128 provide outlet for the passage of fluid under pressure or compressed air to opposite sides of the upper jaw 85 which will force the fruit pulp halves away from the jaws when the halves are freed from the central core.

The fruit to be cored is guided into position between the jaws and pitting knives by means that form a circumferential recess in the peach in the plane of the suture of the pit. This means comprises an upper bracket 130 supported from posts 90 and a lower bracket 131 secured to base casting 1 by cap screws 132. For pitting high grade fruit upper feed blade structure is preferably composed of two blades 133 separated slightly from each other but secured together to move as a unit. Blades 133 are provided with cutting edges 134 and 135 preferably at right angles to each other, the edges of which are inclined outwardly away from the space between the blades causing the pulp of the fruit to be slightly wedged apart as the circumferential groove is formed. Blades 133 are mounted to swing vertically on parallel links 134′ and 135′ pivoted to the bracket 130 by means of pins 136 and to blades 133 by means of pins 137. A spring 138 disposed in recess 139 of bracket 130 and abutting against a projection of link 134 holds the upper structure yieldingly in position. The lower blade structure is likewise preferably composed of two spaced blades 140 secured together to move as a unit for pitting high grade fruit and it too has outwardly beveled cutting edges 134 and 135 parallel to the cutting edges of the upper structure blade. Blade 140 swings on a horizontal line on parallel links 141 and 142 pivoted at their lower ends to the bracket 131 by means of pins 143 and at their upper ends to the blades 140 by means of pins 144. A coil spring 145, interposed between suitable projections of bracket 131 and blades 140, yieldingly maintains the lower blade structure in position. In case it is desired to eliminate the yielding action of the blades, suitable holes may be formed in the supporting brackets and blades through which securing pins may be passed to hold the blades rigidly in the desired relation and a relative adjustment of the blades in fixed positions to vary the size of the pit passageway is permitted.

Gouges 146 and 147 are arranged between the sets of blades 133 and 134 to transversely cut and remove the narrow strip of the peach that enters between the blades of each set. Suitable openings may be provided in the blades of each set adjacent the gouges to permit the discharge of the portions of the annular strip removed during the feeding operation. Preferably the openings are cut in one blade only so as not to provide a ledge upon which the strips can collect. When handling lower grades of fruit the blades may be made solid and the groove in the pulp formed solely by a wedging action in obvious manner without removing a slice, while suitable extensions of the lower blade may be provided between which jaw 85 retreats. The outer surfaces of the blades are approximately flush with the sides of jaws 85 and guide the fruit to the jaws, entering the jaws in the channel that is formed in the fruit.

A tip remover is provided adjacent the path of the peach between blades 133 and 140 which includes a frame 148 pivoted to a projection of frame 131 by means of pin 149. A spring 150 between frame 148 and a stop on bracket 131 urges the frame forwardly against the end wall of an opening 151 in which frame 148 rides. The upper end of frame 140 is curved rearwardly and is provided with a deep V-shaped cut 152 from its upper edge. A tip removing blade 153 is secured to frame 140 in position to cut off the tip of each peach, the curved upper end of the frame and the V-shaped cut therein serving to bring the blade 153 into effective operation on peaches of widely varying sizes, the range of movement of the frame in opening 151 being sufficient for this purpose.

*Operation*

In operation on peaches, the pitting knives 118 and jaws 85 are normally open. Pins 77 are in the upper ends of slots 78 and gauges 73 are in forward position. A peach to be pitted is inserted in the channel between the blades 133 and 140 with the tip toward the operator as shown in Figure 1, and with the plane of the suture of the pit of the peach indicated by a crease on the outside of the fruit, substantially in the vertical central plane of the blades. The operator then forces the peach downwardly between the blades removing the tip and cutting vertical kerfs in the ends of the peach in the plane of the suture of the pit. If the pit is larger than the space between the blades 133 and 140, blade 140 yields swinging in a horizontal plane on links 141 and 142 against the action of spring 145.

The operator moves the peach to the end of the vertical branch of the path between blades 133 and 140, and then moves it bodily in a horizontal direction between the blades until the stem end of the pit engages the ends of gauge plates 73. At this point in the operation a circumferential channel, recess, or groove has been formed around the peach in the plane of the suture of the pit and the pulp halves are slightly wedged apart and the peach is in position for the cutting out of the pit with the suture of the pit between knives 118 and the inner edges of jaws 85 in the channel in the fruit pulp. The hand plate 43 of clutch control shaft 41 is in position to be engaged conveniently by the hand of the operator after he or she completes the movement of the peach in the horizontal direction. As the movement of the peach is completed plate 43 is depressed rocking shaft 41. This movement of shaft 41 rocks the upper end of pawl 33 outward freeing pin 24 for movement under the influence of its spring 27 and causing projection 23 to enter a hole 22 causing rotation of sleeve 20. The end 50 of pawl 51 is normally not in engagement with one of the teeth 49 on ratchet 48 keyed to the main shaft 46, but is between the teeth. Accordingly, the main shaft 46 does not turn immediately, but the sleeve 20 rotates through part of a revolution before the main shaft is brought into operation and rotates cam 114, shifting levers 109 outward and the parts connected thereto to the position of parts shown in Figure 1. As levers 109 move outward holders 82 are brought together and due to the action of springs 96 yieldingly closes jaws 85 and knives 118 firmly about the suture of the pit. Movement of knife holders 76 inward acting through gauge actuating pins 77 and slots 78 causes withdrawal of the gauges 73 so that when the pitting knives are rotated, the ends of the gauges will not mutilate the edges of the fruit halves. In this way the jaws and knives automatically adjust themselves to accommodate varying diameters of pits and at the same time center the fruit pit within the compass of the knives 118. When the jaws are closed they firmly press the knives about the suture of the pit preventing distortion of the knives due to their flexibility, and they also serve to support the flesh of the peach immediately adjacent the line of the cut, so that clean edges are produced.

After the completion of the above operations, pawl end 50 carried on sleeve 20 engages one of the teeth on ratchet 49, resulting in the rotation of the main shaft 46 and pitting knife holders 76 with knives 118 through half a revolution. Rollers 80 moving in cam grooves 81 determine the shape of a central core including the whole pit that is cut from the fruit just before a half revolution of shaft 46 is completed, and without knives 118 crossing the plane of the suture of the pit starting the cutting operation. Cam grooves 81 are preferably shaped to force the knives 118 to follow a path that corresponds approximately to the shape of the pit sides to eliminate the waste of desirable pulp portions that occurs when the knives follow a true circular path in pitting fruit with pits non-circular in transverse section. After the completion of a half revolution of shaft 46, lug 55 of pawl 51 engages the end of throw-out latch 56 and end 55 of pawl 51 thus serving to disconnect shaft 46 from rotating sleeve 20. At the same time registering latch projection 69 engages a notch 66 on registering disk 65 of shaft 46, serving to hold shaft 46 in position for the next operation. Compressed air from openings 129 of upper jaw 85 blows the pulp halves outward, and continued rotation of sleeve 20 actuates cam 114 to move levers 109 inward separating holders 82 together with jaws 85 and knives 118. As the parts separate, fluid or air under pressure from central pipe 23 blows the core from between the knives and clears the knives and jaws of adhering juices and pulp, keeping the machine clean and in sanitary condition. It will be understood that a suitable control valve for the supply of air or other fluid to pipes 123 and 126 may be provided that will admit fluid to the pipes just before the pulp halves are severed from the core and will cut it off when the parts come to rest.

In case the pitting knives 118 encounter an obstacle such as an unusually large pit, clutch disks 10 and 14 will slip permitting the knives to stop and avoiding knife breakages. In such a case the machine is cleared of the abnormal peach if necessary. After the machine is cleared, the friction clutch will again drive the shaft 6 and the mechanism until the revolution of clutch disk 25 is completed when wall 29 of pin 24 will engage the cam end 31 of pawl 33 positioned in groove 30 by the action of spring 44. This will shift pin 24 to the left in Figure 1 disengaging projection 23 from the hole 22 and the parts will come to rest with knives 118 nested in recesses 119 of jaws 85 and the parts open to receive the next fruit to be cored. In this way it will be seen that each time hand plate 43 is actuated a complete cycle of operation occurs and at the end of each cycle the parts come to rest.

While the invention has been above described in great detail, it should be understood that it is not restricted to such details which may be varied widely without departing from the spirit of the invention, and that the scope thereof is to be determined from the terms of the following claims.

Having described preferred embodiments only of the invention, what is desired to be secured by Letters Patent and is claimed as new is:

1. A fruit coring machine comprising means to form a circumferential recess in the fruit to a depth of a core to be removed, oppositely disposed knives curved to approximate the outline of the pit, means to adjust and center said knives on said core and means to cause said knives to follow a determined non-circular path.

2. A peach pitting machine comprising means to expose the edge of the pit, curved pitting knives conforming to the outline of the pit, means to adjust said knives to approximate the exposed pit and means to cause the knives to follow a determined non-circular path approximating the contour of the pit between said edges.

3. A peach pitting machine comprising means to form a circumferential incision in the peach in the plane of the suture of the pit, curved pitting knives normally separated, means to cause said knives to approach each other to substantially encompass the pit, and mechanism to rotate said knives and to cause the knives to bodily follow a non-circular path approximating the contour of the pit sides.

4. In a peach pitting machine, a rotary shaft, a knife holder carried by said shaft and movable transversely of the axis of rotation of said shaft, a pitting knife in said holder, means to cause said holder and knife to move transversely of said axis, means to rotate said shaft, and means separate from the last named means to cause the holder and knife to follow a non-circular path.

5. In a peach pitting machine, a knife holder, a knife secured thereto, means to translate said holder into operative position, means to rotate said holder, and means to shift said holder from its circular course while it is being rotated.

6. In a peach pitting machine, knife holders, knives carried by said holders, means to cause said holders to approach and recede from each other, means to rotate said holders and means to shift said holders from their circular course during their rotation.

7. In a peach pitting machine, recessed jaws designed to enter a circumferential groove in the peach and substantially encompass the pit, curved pitting knives normally nested in said recesses, and means for simultaneously adjusting said jaw and knives as a unit, said means including mechanism to determine the path of movement of said knives.

8. In a peach pitting machine, recessed jaws designed to enter a groove in the peach, curved pitting knives arranged in said recesses, means to adjust said jaws and knives as a unit, means to rotate said knives with repect to said jaws and means to cause said knives to follow in their rotation a non-circular path.

9. In a peach pitting machine, a shaft, knife holders arranged in a recess in said shaft, pins secured to said holders, gauges arranged adjacent said holders, means to guide said gauges, said gauges being provided with inclined slots receiving said pins, and means to move said holders with respect to said gauges causing relative motion between said holders and gauges.

10. In a peach pitting machine, means to guide a peach in position to have the pit cut from the flesh, gauges to limit the movement of the peach, knives, means to bring said knives into operative position when the fruit is in contact with the gauges, and means interconnecting said knives and gauges whereby advancing movement of the knives causes retraction of said gauges.

11. In a peach pitting machine, means to form a groove in the peach and to guide it in position to have the pit cut from the fruit, a gauge to limit the movement of said fruit, jaws designed to enter said groove when the fruit is in operative position, knives designed to enter said groove at the same time, means to move said jaws and knives, and means connecting said gauge and said last named means whereby the movements of the gauge will be controlled by the movement of said jaw and knife moving means.

12. In a peach pitting machine, means to form a groove in the peach and to guide it in position to have the pit cut from the fruit, a gauge to limit the movement of the fruit, knives to cut the pit from the fruit, said knives being normally open, means to yieldingly cause said knives to approach each other and means interconnecting said knives and gauge so that movements of the gauge are directly controlled by the knife movements.

13. A peach pitting machine including jaws recessed to fit around the pit of the peach, curved knives within said recesses, means to move said jaws and knives in synchronism into operative position, means to rotate said knives with respect to said jaws, and means movable with the jaws for determining the path of movement of the knives.

14. A peach pitting machine including jaws recessed to fit around the pit of the peach, curved knives within said recesses, means to yieldingly move said jaws and knives in synchronism into operative position, means to rotate said knives with respect to said jaws, and a cam moveable with the jaws for determining the path of movement of the knives.

15. A peach pitting machine including a rotatable shaft, knife carrying members slidably arranged in recesses in said shaft, slidably mounted jaw carrying members, jaws secured to said members, and a connection between said jaw and knife carrying members to cause said knives and jaws to move in synchronism to operative position, said connection permitting rotation of the knives relative to the jaws when the latter are in operative position.

16. The combination defined in claim 15 in which the connection includes means to cause the knives to follow a non-circular path.

17. A peach pitting machine including a frame, a support on said frame, levers pivoted to said support, means to oscillate said levers, jaw carrying members attached to said levers and guided for rectilinear separational movement, jaws on said members, a rotatable shaft, knife carrying members slidably mounted in said shaft, and means on said jaw carrying members engaging said knife carrying members to cause them to move in synchronism with said jaw carrying members.

18. A peach pitting machine including a frame, a support on said frame, levers pivoted between their ends on said support, jaw carrying members yieldingly connected to one end of each of said levers and guided for rectilinear separational movement, means to operate said levers connected to the other ends thereof, jaws on said members, knife carrying members mounted for movement toward and from each other, said knife and jaw carrying members being connected together for simultaneous movement, said last named connection permitting rotation of the knife carrying members with respect to the jaw carrying members.

19. The combination defined in claim 18 in which the last named connection includes rollers and a guiding cam to determine the path of swinging movement of the knives.

20. A peach pitting machine including a frame, a standard supported on said frame, levers pivoted to said standards between their ends, jaw carrying members connected to one end of each of said levers by a yieldable connection comprising a plunger acting against a spring arranged in a recess in each jaw carrying member, and means to actuate said levers connected to the other ends thereof.

21. In a peach pitting machine of the type that includes jaws designed to fit around the pit of a peach, means to yieldingly move said jaws into operative position, each comprising a swinging lever, an externally threaded member loosely connected to said lever, a sleeve threaded on said member and fitting in a recess in a jaw and a spring the tension of which is controlled by said sleeve arranged between the bottom of said recess and said member.

22. In a peach pitting machine of the type that includes jaws designed to fit around the pit of a peach, a frame, parallel guide rods for said jaws, and a cam carried by said jaws and movable therewith on said guide rods, and rotating pitting knives controlled by said cam.

23. A peach pitting machine including jaws designed to fit around the pit of the peach, means to guide the pit between said jaws, a guage to determine the position of the pit between said jaws, means to cause said jaws to approach and recede from each other in a straight line, means to cause said gauge to move in a straight line normal to said first named line, and mechanism whereby the movements of the gauge are controlled by the movements of the jaws.

24. A peach pitting machine including jaws recessed to encompass the pit, knives fitting within said recesses, said jaws and knives being connected together to move into operative position as a unit, a gauge associated with said jaws and knives and connected thereto so that the movement of the jaws and knives controls the movement of the gauge, and means to actuate said jaws and knives.

25. A peach pitting machine including a recessed rotatable shaft, a gauge in said recess, pitting knife holders in said recess, means to guide said gauge, means to cause the knife holders to move in a direction at right angles to the direction of movement of the gauge, and a pin and inclined slot connection between said knife holders and gauge to cause the movements of these elements to occur in a determined order.

26. A peach pitting machine including a recessed rotatable shaft, a gauge and pitting knife holders in said recess, jaw holders connected to said pitting knife holders, means interconnecting said holders and gauge so that the movements of any one of these elements is dependent upon the movements of the other, and means to actuate one of said holders.

27. A peach pitting machine including jaws designed to substantially encompass the pit of the peach, knives fitting within said jaws, holders for the jaws, holders for the knives, a gauge, means to actuate said jaw holders and mechanism interconnecting said jaw holders with the knife holders and the gauge so that movement of the jaw holders controls the movement of the gauge and knife holders.

28. A peach pitting machine including means to hold a peach in position while the substantially intact pit is being cut therefrom, rotatable pitting knives, and driving means to rotate said knives, said means including a clutch having friction elements that are designed to yield when the knives encounter an obstruction.

29. A peach pitting machine including means to hold a peach in position while the substantially intact pit is being cut therefrom, pitting knives, means to guide said knives in a predetermined path independently of the pit, and means to rotate said knives, said last named means embodying a friction clutch permitting yielding when the knives encounter an obstruction.

30. A peach pitting machine including means to hold a peach in position while the pit is being cut therefrom, pitting knives, mechanism to move the knives into operative position, mechanism to rotate said knives, power means and a friction clutch that slips when the knives engage an obstruction disposed between said power means and said mechanisms.

31. A peach pitting machine including pitting knives mounted for movement toward and from each other and for bodily rotation to simultaneously cut the substantially intact pit from the peach, mechanism to effect the adjustment of the knives, mechanism to rotate the knives, means to automatically operate said mechanisms in succession and to terminate the operation of said mechanisms at the end of a predetermined cycle, and power means to operate said last named means, said power means including a clutch having elements in frictional engagement and between which slipping can occur if the knives encounter an unusual obstruction.

32. A peach pitting machine including a rotatable shaft, pitting knives connected to said shaft, reciprocating elements connected to said knives in a manner permitting their rotation, a driving sleeve, mechanism operated by said sleeve to automatically actuate said reciprocating elements and shaft in succession, and means including relatively yieldable elements to drive said sleeve.

33. A peach pitting machine including a rotatable shaft, pitting knives connected to said shaft, reciprocating jaws, said knives being connected to said jaws to move in synchronism therewith at predetermined intervals but being free to rotate with respect thereto, a driving sleeve, mechanism under the control of the operator and operated by said sleeve to actuate said jaws and shaft in succession, and means including relatively yieldable elements to drive said sleeve.

34. A peach pitting machine including pitting knives mounted to revolve and move toward and from each other, mechanism to automatically reciprocate and revolve said knives in succession, means readily accessible to an operator to set said mechanism in operation, means to automatically stop said mechanism at the completion of a cycle of operations, and driving means for said mechanism, said driving means including elements that will yield under abnormal conditions.

35. A fruit coring machine comprising means to halve the fruit, means to cut the core therefrom, fluid means for separating said halves from the core and separate fluid means acting transversely of said first named fluid means for ejecting said core.

36. A peach pitting machine comprising peach halving means, means to cut the halves from the pit and fluid means acting in directions at a substantial angle to each other to discharge said halves and pit in different directions.

37. A peach pitting machine comprising means to halve the peach, means to cut the pit from the halves and pneumatic means to separately eject the halves and pit in different directions.

38. A peach pitting machine comprising means to cut a circumferential halving recess in the peach, a jaw to enter said recess, means to sever the pit from said halves, fluid discharge openings in said jaw to separate said halves, and means to intermittently supply fluid to said openings.

39. A peach pitting machine comprising means to cut a circumferential halving recess in the peach, a jaw to enter said recess, curved pitting knives to simultaneously cut both halves of the peach from the pit, fluid discharge openings in said jaw to separate said halves from the pit, and means to supply fluid to said openings.

40. A peach pitting machine comprising means to cut a circumferential halving recess in the peach, a jaw to enter said recess, curved separable pitting knives to simultaneously cut both halves of the peach from the pit, fluid discharge openings in said jaw to separate said halves from the pit, means to supply fluid to said openings, and further fluid means arranged to discharge between said knives to eject the pit from the machine.

41. A peach pitting machine comprising means to guide a peach into position, a gauge to limit the movement of the peach, jaws and pitting knives movable toward the pit to center the peach, means to move said jaws and knives, said last named means permitting rotation of the knives with respect to the jaws, mechanism to rotate the knives, and power means to operate said last named means and mechanism, said power means including an automatically acting clutch to stop the operation at regular intervals and elements that are yieldable to permit the interruption of the cycle of operations under abnormal conditions.

42. In a peach pitting machine, a base, uprights secured to said base, jaw carrying members slidably mounted on said uprights, jaws on said members, a hollow shaft, reciprocable pitting knives secured to said shaft, cams on said jaw carrying members to determine the rotary motion of said knives and to control their reciprocating motion, mechanism to rotate said shaft at predetermined intervals, mechanism to reciprocate said jaw carrying members at predetermined intervals, and power means for said mechanisms including an automatically operating clutch to stop the mechanisms under normal conditions and yieldable elements to stop said mechanisms under abnormal conditions.

43. A peach pitter as defined in claim 42 including means to discharge fluid under pressure in a direction at right angles to the face of said jaws and between said knives.

44. A peach pitter as defined in claim 42, including means to discharge air under pressure in a direction at right angles to the face of said jaws and between said knives.

45. A peach pitting machine comprising means to cut a circumferential halving recess in the peach, a recessed jaw to enter said recess, means to sever the pit from said halves, nested within the recess of the jaw, a pressure means behind said jaw by action of which the recessed jaw engages the pitting means and forces it firmly against the contour of the pit at its suture, adjusting means secured to the jaw to regulate the distance of closing of the jaw and pitting means, a fluid or pneumatic discharge opening in said jaw to separate said halves, and means to supply fluid to said opening.

46. In a peach pitting mechanism, holding means contacting with the inside walls of an incision made circumferentially around the peach; a recess formed in said holding means within which is nested peach pitting means; adjusting means connected with said holding and pitting means to bodily rectilinearly simultaneously move the pitting and holding means whereby said holding means and pitting means can be adjusted in unison to embrace various diameters of peach pits at their sutures, prior to the operation of the pitting means approximately about the longitudinal axis of the pit.

47. A clingstone peach pitting machine, comprising means for exposing the suture of the pit of the peach by a cut of material width extending substantially around the peach, severing means for substantially encompassing the pit, and means for rotating and guiding the severing means independently of the pit to cut the flesh of the peach from the pit in a non-circular path that approximates the contour of the sides of the pit.

48. A clingstone peach pitting machine, comprising means for forming a circumferential incision in the peach substantially in the plane of the suture of the pit to the depth of the pit, mechanism for automatically inserting a severing means in said incision and for adjusting said severing means to substantially surround the pit, means for cutting the pit from the peach, and means to guide said cutting means in a determined path approximating the contour of the pit but that does not cross the suture of the pit.

49. A machine for cutting a substantially whole pit from a peach having the edges of the pit in the plane of its suture exposed, which comprises cutting means for substantially encompassing the pit and means for actuating said cutting means, said last named means causing the cutting means to swing through substantially 180° in a non-circular path approximating the contour of the pit.

50. A machine for cutting a substantially whole pit from a peach having the edges of the pit in the plane of its suture exposed, which comprises curved cutting blades, means for adjusting the cutting blades, substantially to the outline of the exposed pit edges and mechanism for moving said cutting means transversely of such edges on a non-circular path unguided by the body of the pit.

51. A peach pitting machine including reciprocably mounted jaw carrying members, jaws on said members, a rotatable shaft, knives, knife carrying members, said knife carrying members being connected to said shaft in a manner permitting rectilinear movement thereof transverse to the axis of said shaft, and rotation with said shaft, and means interconnecting said knife and jaw carrying members to cause the former to move with the latter, said last named members permitting rotation of the knives with respect to the jaw carying members.

In testimony whereof I affix my signature.

ARTHUR L. DUNCAN.